UNITED STATES PATENT OFFICE.

FRIEDRICH STOLZ, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PYRAZOLONE DERIVATIVE.

1,053,240. Specification of Letters Patent. Patented Feb. 18, 1913.

No Drawing. Application filed May 14, 1912. Serial No. 697,324.

*To all whom it may concern:*

Be it known that I, FRIEDRICH STOLZ, Ph. D., chemist, a citizen of the Empire of Germany, residing at Höchst-on-the-Main, Germany, have invented certain new and useful Improvements in Pyrazolone Derivatives, of which the following is a specification.

I have found that by causing iodin to act upon 1-(p-bromphenyl)-2-3-dimethyl-5-pyrazolone, a new compound: the 1-(para-bromphenyl)-2.3-dimethyl-4-iodo-5-pyrazolone is obtained. This compound is of great therapeutical value and can be used as a substitute for potassium iodid. It acts both as a sedative and as an antipyretic, and does not produce the undesirable secondary effects by which the administration of potassium iodid is attended.

The following example illustrates my invention, the parts being by weight: 254 parts of powdered iodin are introduced while stirring into a solution of 267 parts of 1-(para-bromphenyl)-2-3-dimethyl-5-pyrazolone (*Berichte* vol. 33, page 2609) in 800 parts of benzene, and the mixture is heated for two hours to 50–60° C. After having added a solution of 75 parts of anhydrous sodium carbonate in 450 parts of water, the whole is digested for 4–6 hours in the reflux-apparatus, on the water bath. The benzene solution is separated from the aqueous solution, and after washing, first with a dilute solution of bisulfite and afterward with sodium carbonate for removing the excess of iodin, it is dried and the benzene distilled off. The remaining product of the reaction is recrystallized in alcohol and then forms colorless crystals, melting at 163° C., scarcely soluble in water, difficultly soluble in diluted hydrochloric acid, readily soluble in hot alcohol and benzene.

Having now described my invention, what I claim, is:

As a new product, the 1-(para-bromphenyl)-2-3-dimethyl-4-iodo-5-pyrazolone, having the constitution

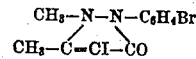

being colorless crystals melting at 163° C., scarcely soluble in water, difficultly soluble in diluted hydrochloric acid, readily soluble in hot alcohol and benzene.

In testimony whereof, I affix my signature in presence of two witnesses.

FRIEDRICH STOLZ.

Witnesses:
 JEAN GRUND,
 CARL GRUND.